Jan. 19, 1932. C. G. WORSLEY ET AL 1,841,773
RESILIENT TIRE
Filed June 13, 1929 2 Sheets-Sheet 1
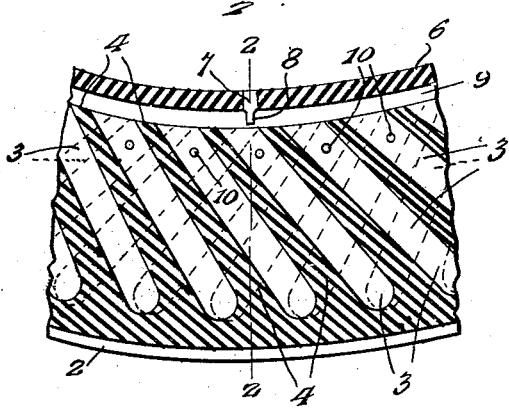
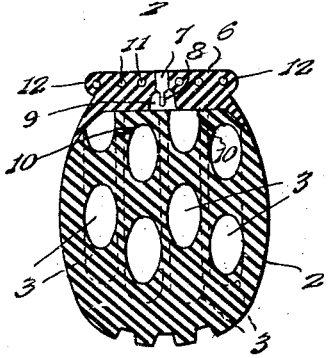
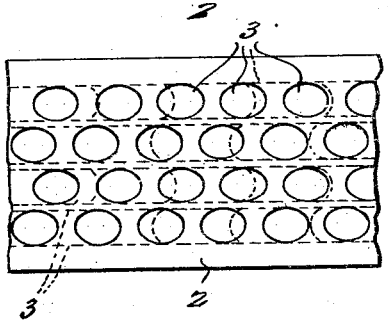
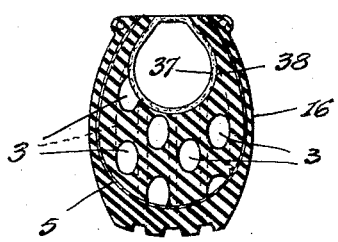
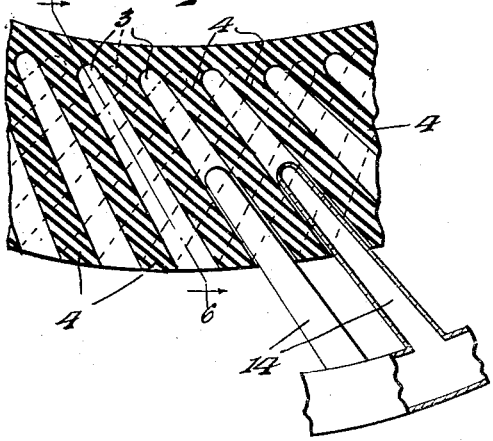
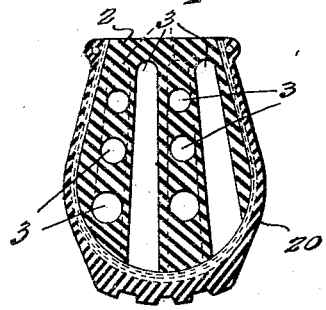
Inventors
C. G. Worsley.
P. L. Harkin.
By Lacey & Lacey, Attorneys

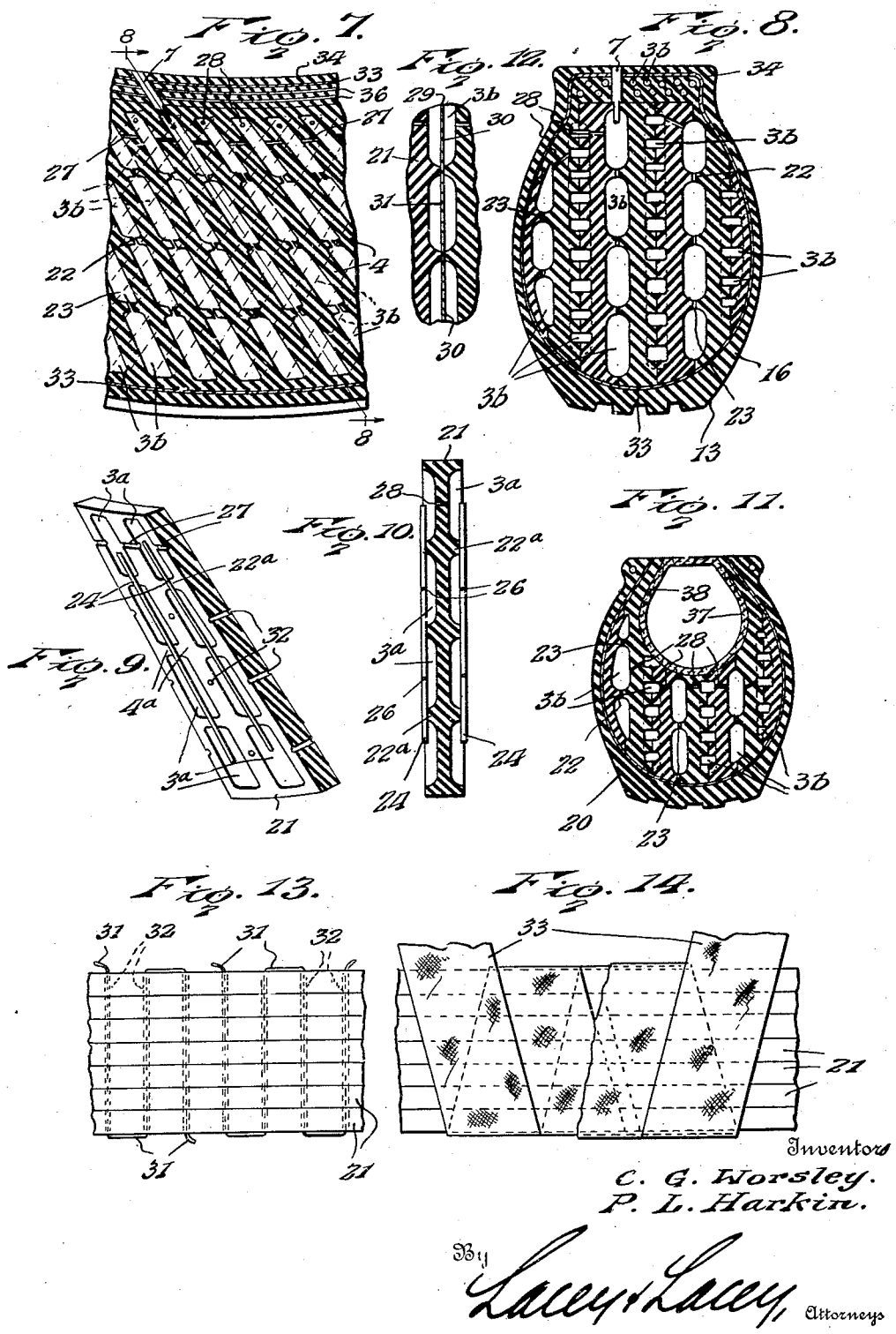

Patented Jan. 19, 1932

1,841,773

UNITED STATES PATENT OFFICE

CHARLES GRAHAM WORSLEY, OF SURREY HILLS, VICTORIA, AND PATRICK LOUIS HARKIN, OF CARLTON, VICTORIA, AUSTRALIA

RESILIENT TIRE

Application filed June 13, 1929, Serial No. 370,700, and in Australia June 13, 1928.

This invention relates to resilient or cushion tires and refers more particularly to rubber or like tires of the cellular type wherein a series of independent air cells or pockets are formed in the tire body, such cells being adapted to contain air at atmospheric or other pressure.

The primary object of the present invention is to provide an improved nonpuncturable and nonburstable cushion tire of the general type referred to, but having greater efficiency in the absorption of road shocks without the "deadness" or inertia and other disadvantages of existing cushion tires. Moreover, the improved tire is adapted to yield readily to relatively light road shocks whilst its resistance to compression increases in accordance with the degree of shock or load to which it is subjected.

A tire in accordance with this invention is characterized primarily by having a series of air cells or pockets which extend obliquely to the circumference of the tire and form a series of corresponding circumferentially inclined intervening webs or partitions. The inclined webs are adapted to bend or flex freely under the effect of road shocks and the weight of the vehicle to which the tire is applied, thus obviating the undue resistance to flexure caused by the usual radially disposed webs between the cells of existing cushion tires.

The invention is also characterized by the construction of a tire of the above mentioned type from a series of annular layers or laminations which are provided in their side faces with open pockets or half cells so that when the layers are placed in side by side relationship and vulcanized together the desired complete cells are formed in the tire.

The invention also provides for reinforcing the tire without impairing its resiliency, and includes various other features tending to improve the construction and shock absorbing properties of cellular cushion tires.

But in order that this invention may be better understood reference will now be made to the accompanying sheets of drawings which are to be taken as part of this specification and read herewith:—

Figure 1 is a fragmentary circumferential section of a tire in accordance with one embodiment of this invention.

Figure 2 is a cross section of a tire taken on the line 2—2 in Figure 1.

Figure 3 is a plan view of Figure 1 but in which a closing band hereinafter referred to is omitted for convenience of illustration.

Figure 4 is a cross sectional view of a tire incorporating an inflatable tube according to another embodiment of the invention.

Figure 5 is a fragmentary circumferential section of a tire according to another embodiment of the invention and indicating cores or mandrels which may be employed to form cells or pockets in the tire.

Figure 6 is a cross section of a tire produced in accordance with Figure 5.

Figure 7 is a fragmentary circumferential section of a tire according to another embodiment of the invention.

Figure 8 is a cross section of Figure 7 as indicated by the lines 8—8.

Figure 9 is a fragmentary view in perspective of an annular layer or lamination from a series of which a tire as illustrated in Figures 7 and 8 is built.

Figure 10 is a cross section of a layer or lamination taken through the longitudinal centre of the half cells thereof.

Figure 11 is a reduced cross section of a tire built up of annular layers and incorporating an inflatable tube.

Figure 12 is a fragmentary cross section of adjacent layers showing a rubber impregnated strip or partition between them.

Figure 13 is a fragmentary plan of a series of assembled layers indicating the manner of reinforcing and binding them together by rubber impregnated threads.

Figure 14 is a fragmentary plan of a series of assembled layers indicating a manner of applying an external wrapping or reinforcement of rubber impregnated fabric or the like.

In accordance with this invention and referring more particularly to Figures 1 to 6, the tire body 2, which may be composed of any suitable kind of rubber or other material or composition, is provided with air cells or pockets 3 which are of elongated form and so disposed within the body of the tire that their length extends obliquely to the circumference of the tire or substantially tangentially in relation to a circle struck from the centre of the tire. Oblique or substantially tangential partitions or webs 4 are thus formed between the adjacent cells and these oblique webs are adapted to bend or flex freely under the effect of road shocks and the weight of the vehicle to which the tire is applied, thus obviating the undue resistance to flexure caused by the usual radially disposed webs between the cells of existing cushion tires. The oblique webs 4 are not subjected to compression in a direction radially of the tire or in a direction longitudinally of the webs but are subjected by the load or by road shocks to bending stresses in a direction which is inclined in relation to the length of the webs. Consequently crushing or crumpling of the webs is eliminated and road shocks will be effectively distributed so that a highly efficient shock absorbing function is obtained.

In all cases it is preferred that some of the cells and webs should extend in opposite direction to the other cells and webs, and adjacent circumferential rows of the cells are preferably inclined in opposite directions as illustrated in the drawings.

The elongated air cells may be of circular or any other suitable cross sectional shape, and as seen in Figures 1, 2 and 3, they may extend from the inner circumference of the tire body 2 to a suitable distance from the outer circumference thereof. The cross sectional area of each cell may be substantially uniform throughout its length as seen in Figures 1, 2 and 3 or if desired the cross sectional area may increase progressively from the inner circumference towards the outer circumference as seen in Figures 4 to 11 with the result that the webs 4 between the cells are of substantially uniform cross sectional area throughout their length.

Viewing the inner circumference of the tire, for instance as in Figure 3, the elongated cells may be staggered or arranged in rows extending diagonally across the tire in such a manner that a maximum number of the cells may be provided, the relatively large number of dividing webs between the cells being of such form and dimensions as to ensure maximum resiliency combined with ample strength and stability. By this construction the excessive weight and inertia which results from the relatively thick walls or bodies of rubber in existing cushion tires is obviated in a simple and highly efficient manner.

The elongated oblique cells 3 are adapted, under normal conditions, to contain air preferably at atmospheric pressure and in order to retain this air the inner ends of the cells may be permanently closed by any suitable means such for instance as a closing band 6 of rubber or other suitable material as seen in Figures 1 and 2, which may extend completely around the inner circumference of the tire.

In order to obviate any liability of collapse of the tire through the leakage of air from the cells and the consequent creation of a vacuum therein, provision may be made to permit of the entrance of atmospheric air into the cells while at the same time minimizing the possibility of air being driven out of the cells. For this purpose one or more suitable valves, such for instance as a rubber tube 7 completely open at its outer end and having its inner end 8 restricted or crimped as seen in Figure 2, may be fitted in some suitable position in communication with the various cells of the tire. The closing band 6 may be provided with one or more internal circumferential grooves or passages 9 into which the inner ends of the cells open. Or if desired only the inner row or rows of cells may communicate directly with the passage 9, the inner and outer rows of cells being connected by pin holes or vents 10 as in Figures 1 and 2. The valve 7 may project from the inner face of the closing band into the said passage 9. Under the influence of road shocks or loads the air imprisoned within the cells is compressed in accordance with the intensity of the shock or load and thus serves as a secondary resistance to reinforce or supplement the primary resistance afforded by the oblique webs 4 between the cells. On the other hand under relatively light shocks or loads compression of the air in the cells is relatively slight and the dividing webs 4 take substantially the whole of the shock or load.

The closing band 6 may be of any suitable cross sectional shape and may be reinforced by circumferentially extending wires 11 which also assist in holding the tire upon the rim of a wheel. The band 6 is shown in Figure 2 with beaded edges 12 but it may have straight side edges or be of any other suitable form according to the type of wheel rim upon which the tire is to be mounted.

The tire may be of any desired cross sectional shape and its height or radial dimension may be extended so as to provide cells 3 and dividing webs 4 of any desired length without widening the tire beyond the usual limits determined by the width of the wheel rim. By thus extending the length of the air cells and the webs the resilience of the tire may be increased owing to the free flexure of the webs under the influence of loads and shocks.

In producing a tire such as is illustrated in Figures 1, 2 and 3 the cells 3 may be formed in the body of the tire by appropriate mandrels. The cell surfaces may be slightly or superficially vulcanized prior to the withdrawal of the mandrels so as to support the webs 4 during final vulcanization. The tire may have a suitable tread portion 13 and may if desired be reinforced with fabric or other reinforcement but this is not essential. When the closing band is placed in position the assembly is finally vulcanized.

In the embodiment illustrated in Figures 5 and 6 the cross sectional area of each cell decreases progressively from the outer circumference of the tire towards the inner circumference, and the cells 3 terminate at their closed inner ends a suitable distance from the inner circumference of the tire body while their outer larger ends are open. In this case the cells may be formed by hollow tapered mandrels as indicated at 14 and the webs 4 extending between the cells are of substantially uniform thickness or cross section throughout their length. Steam passing into the hollow mandrels has the effect of superficially vulcanizing the surfaces of the cells 3 so that they will retain their shape during final vulcanization.

To close the outer open ends of the cells of the tire body and to complete the tire an outer casing 16 with a tread portion 13 may be built up around the tire body 2 as in Figure 4 and the assembly vulcanized. Fabric or other suitable reinforcement 5 may be incorporated in the tire if so desired. In this embodiment also, provision may be made to permit of the entrance of atmospheric air to the cells in order to prevent collapse of the tire body. For instance a non-return valve such as described with reference to Figures 1 and 2 may be provided and the cells placed into communication with each other and with the valve in any suitable manner.

Referring now to Figures 7 to 14 which illustrate preferred embodiments of the invention, the cellular tire body is built up of a series of annular layers or laminations 21 (see particularly figures 9, 10 and 12) which are first formed in suitable moulds provided with projections adapted to form open pockets or half cells 3a in each side face of each layer so that when a series of the layers are placed side by side and vulcanized together complete oblique cells are formed in the tire body as in Figures 7, 8 and 11. The ribs or portions 4a between the half cells 3a of the layers also form the intervening webs 4 between the cells of the tire body.

It is considered that the cellular tire body may be effectively internally reinforced without impairing its resiliency and shock absorbing properties by subdividing the cells into sub-cells 3b by transverse ribs or diaphragms 22 (Figures 7, 8, 11 and 12). For this purpose the half cells 3a of the layers are divided at intervals in their length by half diaphragms or ribs 22a which are formed during the moulding of the layers by appropriately shaped moulds or cores.

Apertures 23 may be formed through the diaphragms 22, 22a to place the sub-cells 3b into communication with each other so that when the tire is subjected to road shocks or loads, air may be forced from the outer sub-cells through the apertures 23 into the inner sub-cells and may return to the outer sub-cells after removal of the load. The diameter of the apertures 23 is exaggerated in the drawings for the convenience of illustration but in reality the apertures resemble pores or pin holes. It may be preferred, however, to employ tubes 24 (Figures 9 and 10) of pre-vulcanized rubber or the like to place the inner and outer sub-cells 3b into communication with each other, such tubes being applied to the layers 21 before the latter are assembled and finally vulcanized. The tubes open at their opposite ends into the inner and the outer sub-cells, and have small apertures 26 intermediately of their length registering with the intermediate sub-cells. A soapy solution may be passed through the pre-vulcanized tubes 24 so that in the event of the tubes collapsing during the vulcanization of the assembled layers, the inner walls of the tubes will not adhere to each other but will still permit the passage of air through the tubes.

The cells in each circumferential row may communicate with each other by way of pin point apertures or vents 27, as in Figures 7 and 9, and adjacent circumferential rows of cells may be placed into communication by further apertures or vents 28 as in Figures 7, 8, 10 and 11.

After the layers or laminations 21 have been placed together in side by side relationship and before they have been vulcanized, threads or cords 31 (Figure 13) impregnated with rubber, may be laced through transverse holes 32 (Figures 9 and 13) in the layers so that when the latter are vulcanized the cords will be amalgamated therein and thus effectively bind the layers and transversely reinforce the structure. Furthermore, what is considered to be of importance, the lacing retards sideward expansion or bulge of the tire under road pressure or shocks and causes the structure to flex circumferentially rather than laterally. Two of the cords 31 may be laced through each circumferential row of holes 32 and tightened circumferentially in opposite directions.

If desired annular strips or partitions 29, consisting of rubber impregnated fabric, may be interposed between adjacent side faces of the layers as indicated in Figure 12. These strips sub-divide the sub-cells 3b longitudinally and may have small vents 31 to permit air to pass therethrough to either side of each strip. The strips 29 also reinforce the structure without adding materially to its weight. Upon vulcanization of the cellular body the strips become amalgamated therewith.

An outer casing 16 may be built up around the cellular body and the whole then vulcanized to form a unit. Such a construction is illustrated in Figures 7 and 8 where the numeral 33 indicates reinforcement, such for instance as a rubber impregnated fabric, applied around the assembled laminations and a rubber band 34, having embedded metal wires or rings 36, which extend around the inner circumference of the tire. The outer casing 16, which may be comparatively thin and include a suitable tread 13, is built up around the reinforcement 33 and the structure finally vulcanized. A valve 7 (Figure 8) may be provided to permit the entrance of atmospheric air into the cells of the structure. The reinforcement 33 preferably comprises two lengths or strips of rubber impregnated fabric which are wound spirally in opposite directions around the cellular structure as indicated in Figure 14 as such an arrangement ensures a maximum reinforcing and binding effect.

It is to be understood, however, that a cellular tire body in accordance with any of the foregoing embodiments may be detachably encased within an ordinary tire cover or casing 20 as in Figures 6 and 11.

Furthermore the improved tire may be used in conjunction with one or more pneumatic tubes as indicated, for example, in Figures 4 and 11, wherein a tube 37 extends within a circumferential channel 38 formed in the inner periphery of the tire body. In such instances the open ends of some of the cells 3 or inner sub-cells 3b may be closed by the inflated tube 37 which acts in a manner similar to the non return valve 7 of Figures 1, 2 and 8, while the other cells or inner sub-cells may be closed.

Having now described our invention what we claim as new and desire to secure by Letters Patent is:

1. An improved resilient tire comprising a tire body provided with laterally spaced circumferential rows of air cells which extend obliquely relative to the longitudinal circumference of the tire, the cells of certain rows being inclined in an opposite direction to those of other rows so that the cells of the various rows cross and form between them similarly inclined and crossed webs or partitions for the purpose specified.

2. A vulcanized resilient tire including a series of annular layers or laminations provided in their side faces with half cells or open pockets, said layers being assembled in side by side relationship with the half cells of one layer registering with the half cells of an adjacent layer so that complete cells and intervening webs are formed in the vulcanized tire body.

3. A vulcanized resilient tire comprising a series of annular layers or laminations provided in their side faces with half cells or open pockets which are disposed obliquely relative to the longitudinal circumference of the tire, said layers being assembled in side by side relationship with the half cells of one layer registering with the half cells of an adjacent layer so that complete cells and intervening webs extending obliquely to the circumference of the tire are formed within the vulcanized tire body.

4. A vulcanized resilient tire comprising a series of annular layers or laminations provided in their side faces with half cells or open pockets which are disposed obliquely to the circumference of the tire, said layers being assembled in side by side relationship with the half cells of one layer registering with the half cells of an adjacent layer so that complete cells and intervening webs extending obliquely to the circumference of the tire are formed within the vulcanized tire body, said cells being of progressively increasing cross sectional area towards the outer periphery of the tire so that the webs between the cells are of substantially uniform cross section throughout their length.

5. A resilient tire having a series of air cells or pockets extending obliquely to the circumference of the tire and forming a series of corresponding circumferentially inclined intervening webs or partitions, said cells being arranged in circumferential rows, circumferential air vents or passages formed in the tire body to establish communication with the air cells of each circumferential row and transverse air vents or passages connecting the cells of the different circumferential rows for the purpose specified.

6. A vulcanized resilient tire including a series of annular layers or laminations provided in their side faces with half cells or open pockets, said layers being assembled in side by side relationship with the half cells of one layer registering with the half cells of an adjacent layer so that complete cells and intervening webs are formed in the vulcanized tire body, said cells being subdivided by internal transverse ribs or diaphragms extending between the intervening webs, the resultant sub-cells being connected by air vents or passages extending through said diaphragms for the purpose specified.

7. A vulcanized resilient tire including a series of annular layers or laminations provided in their side faces with half cells or open pockets, said layers being assembled in side by side relationship with the half cells of one layer registering with the half cells of an adjacent layer so that when said layers are vulcanized together complete cells and intervening webs are formed in the tire body, said cells being subdivided by internal transverse ribs or diaphragms extending between the intervening webs, the resultant sub-cells being connected by tubes extending through said ribs or diaphragms for the purpose specified.

8. A vulcanized resilient tire including a series of annular layers or laminations provided in their side faces with half cells or open pockets, said layers being assembled in side by side relationship with the half cells of one layer registering with the half cells of an adjacent layer so that complete cells and intervening webs are formed in the vulcanized tire body, said annular layers being provided with transverse holes to receive cords or threads which are laced through said holes after the layers have been assembled in side by side relationship for the purpose specified.

9. A vulcanized resilient tire including a series of annular layers or laminations provided in their side faces with half cells or open pockets, said layers being assembled in side by side relationship with the half cells of one layer registering with the half cells of an adjacent layer so that complete cells and intervening webs are formed in the vulcanized tire body, said annular layers being bound together and reinforced by cords or threads which are impregnated with rubber and pass transversely through said layers.

10. A vulcanized resilient tire including a series of annular layers or laminations provided in their side faces with half cells or open pockets, said layers being assembled in side by side relationship with the half cells of one layer registering with the half cells of an adjacent layer so that complete cells and intervening webs are formed in the vulcanized tire body, and annular reinforcing strips extending circumferentially of the tire between said layers and adapted to subdivide the said cells, substantially as described.

11. A resilient tire comprising a body having therein a series of air cells extending obliquely to the circumference of the tire and forming a series of corresponding circumferentially inclined intervening webs or partitions, and an outer casing or cover enclosing the said cellular body so as to form at its outer periphery a tread portion and at its inner periphery a rim mounting portion, said casing and cellular body forming a unitary structure.

12. A resilient tire comprising a body having therein a series of air cells extending obliquely to the circumference of the tire and forming a series of corresponding circumferentially inclined intervening webs or partitions, and a fabric reinforcement impregnated with rubber wound spirally around said cellular body.

13. A resilient tire comprising a series of annular layers or laminations provided in their side faces with half cells or open pockets which are disposed obliquely to the circumference of the tire, said layers being assembled in side by side relation with the half cells of one layer registering with the half cells of an adjacent layer so that complete cells and intervening webs extending obliquely to the circumference of the tire are formed within the tire body, the cells of certain layers or laminations being inclined in an opposite direction to the cells of other layers so that the cells of the various rows cross and form between them similarly inclined and crossed webs or partitions.

In testimony whereof we affix our signatures.

C. G. WORSLEY.
P. L. HARKIN.